United States Patent
Tsuiki et al.

(10) Patent No.: US 10,164,490 B2
(45) Date of Patent: Dec. 25, 2018

(54) ROTARY ELECTRIC MACHINE AND MANUFACTURING METHOD THEREFOR

(71) Applicant: MITSUBISHI ELECTRIC CORPORATION, Chiyoda-ku (JP)

(72) Inventors: Hironori Tsuiki, Chiyoda-ku (JP);
Tatsuro Hino, Chiyoda-ku (JP);
Atsushi Sakaue, Chiyoda-ku (JP);
Akira Hashimoto, Chiyoda-ku (JP);
Kazunori Muto, Chiyoda-ku (JP);
Masashi Nakamura, Chiyoda-ku (JP);
Shinkichi Sawa, Chiyoda-ku (JP);
Hiroyuki Akita, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 199 days.

(21) Appl. No.: 15/027,658

(22) PCT Filed: Jun. 27, 2014

(86) PCT No.: PCT/JP2014/067205
§ 371 (c)(1),
(2) Date: Apr. 6, 2016

(87) PCT Pub. No.: WO2015/052964
PCT Pub. Date: Apr. 16, 2015

(65) Prior Publication Data
US 2016/0261159 A1    Sep. 8, 2016

(30) Foreign Application Priority Data
Oct. 8, 2013 (JP) .................................. 2013-211005

(51) Int. Cl.
*H02K 3/28*    (2006.01)
*H02K 3/12*    (2006.01)
(Continued)

(52) U.S. Cl.
CPC .................. *H02K 3/12* (2013.01); *H02K 3/28* (2013.01); *H02K 15/0435* (2013.01); *H02K 15/085* (2013.01); *H02K 15/0031* (2013.01)

(58) Field of Classification Search
CPC .. H02K 3/04; H02K 3/12; H02K 3/28; H02K 15/0435; H02K 15/085; H02K 15/0031
(Continued)

(56) References Cited

U.S. PATENT DOCUMENTS

| 6,710,496 B2* | 3/2004 | Fujita | H02K 3/12 310/201 |
| 6,894,417 B2* | 5/2005 | Cai | H02K 3/12 310/184 |

(Continued)

FOREIGN PATENT DOCUMENTS

| CN | 101689777 A | 3/2010 |
| JP | T13-748 U | 6/1924 |

(Continued)

OTHER PUBLICATIONS

International Search Report (PCT/ISA/210) dated Aug. 19, 2014, by the Japanese Patent Office as the International Searching Authority for International Application No. PCT/JP2014/067205.
(Continued)

*Primary Examiner* — Burton Mullins
(74) *Attorney, Agent, or Firm* — Buchanan Ingersoll & Rooney PC

(57) ABSTRACT

In a rotary electric machine according to the present invention, an armature winding includes a plurality of distributed winding bodies that are each produced by winding a single conductor wire that is insulated, that is jointless and continuous, and that has a constant cross-sectional area perpendicular to a longitudinal direction, the conductor wires include first through third coil end portions that link first
(Continued)

through fourth rectilinear portions and first through fourth rectilinear portions, and are formed such that radial widths w' of the first through fourth rectilinear portions are wider than radial widths w of the first through third coil end portions.

6 Claims, 15 Drawing Sheets

(51) Int. Cl.
  *H02K 15/04* (2006.01)
  *H02K 15/085* (2006.01)
  *H02K 15/00* (2006.01)
(58) Field of Classification Search
  USPC .................................. 310/180, 184–185, 208
  See application file for complete search history.

(56) References Cited

U.S. PATENT DOCUMENTS

| 7,268,455 B2* | 9/2007 | Kouda | ..................... H02K 3/12 29/596 |
|---|---|---|---|
| 2002/0043886 A1 | 4/2002 | Fujita et al. | |
| 2010/0141078 A1 | 6/2010 | Kouda et al. | |

FOREIGN PATENT DOCUMENTS

| JP | 2002-125338 A | 4/2002 |
| JP | 2003-018778 A | 1/2003 |
| JP | 2006-014530 A | 1/2006 |
| JP | 2008-125298 A | 5/2008 |
| JP | 2009-112186 A | 5/2009 |
| JP | 2011-188721 | 9/2011 |
| JP | 2011-234531 A | 11/2011 |
| JP | 2012-100433 A | 5/2012 |
| JP | 2013-094019 A | 5/2013 |

OTHER PUBLICATIONS

Written Opinion (PCT/ISA/237) dated Aug. 19, 2014, by the Japanese Patent Office as the International Searching Authority for International Application No. PCT/JP2014/067205.

Office Action dated Jul. 26, 2017, by the Chinese Patent Office in corresponding Chinese Patent Application No. 201480055503.7 and English translation of the Office Action. (13 pages).

Office Action (Notification of Reason(s) for Refusal) dated Jan. 31, 2017, by the Japanese Patent Office in corresponding Japanese Patent Application No. 2015-541453 and English translation of the Office Action. (7 pages).

* cited by examiner

FIG. 9
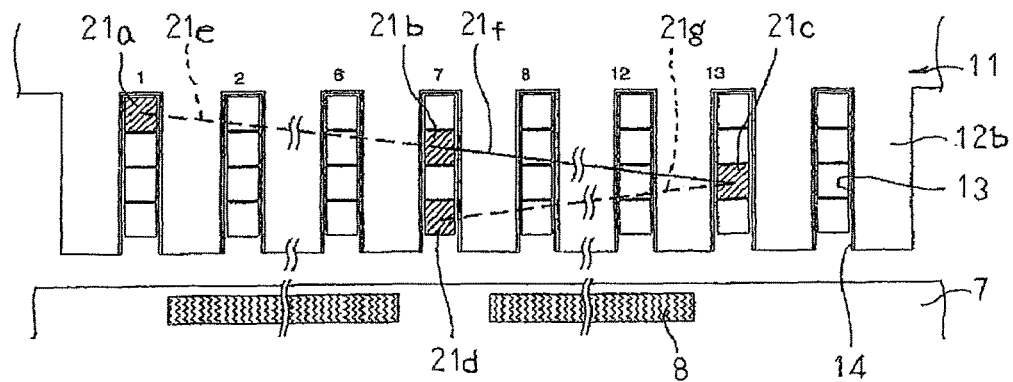
FIG. 10
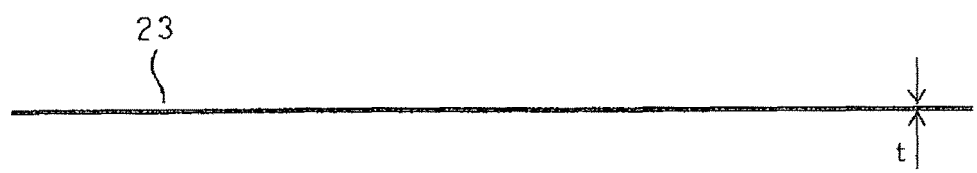
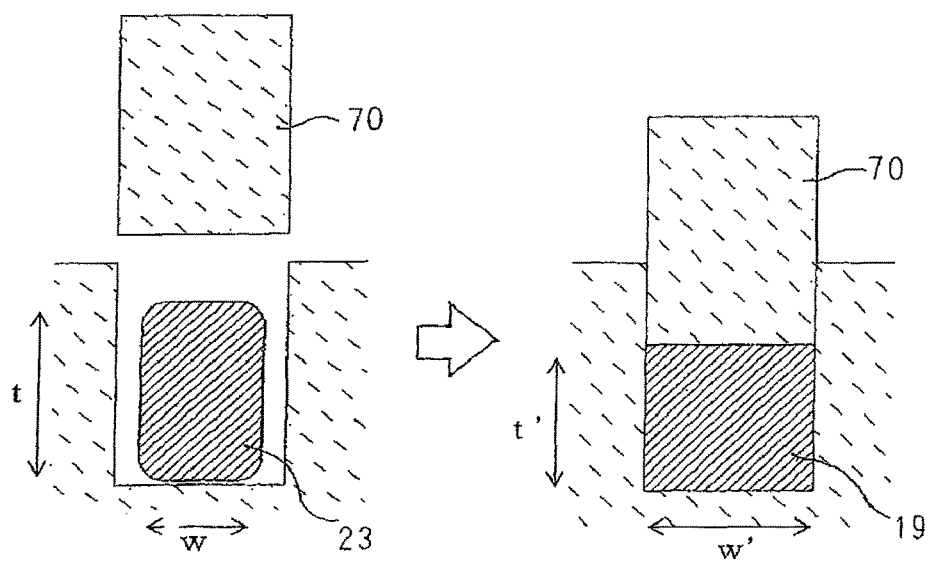
FIG. 11A          FIG. 11B

ROTARY ELECTRIC MACHINE AND MANUFACTURING METHOD THEREFOR

TECHNICAL FIELD

The present invention relates to a rotary electric machine such as an electric motor or a generator, for example, and to a manufacturing method therefor, and particularly relates to a shape of a winding body that constitutes an armature winding.

BACKGROUND ART

In recent years, compactness, high output, and high quality have been required in rotary electric machines such as electric motors or generators. In high-output rotary electric machines of this kind, since high voltages are applied, it has been necessary to increase insulation performance by increasing the thickness of insulating material that covers conductor wires that are mounted into the armature core because electric potential differences that arise between the conductor wires, particularly in coil ends, are increased. However, when the thickness of the insulating material is increased, the ratio occupied by the conductor wires inside the slots (the space factor) is reduced, reducing the efficiency of the rotary electric machine.

In consideration of such conditions, conventional rotary electric machines have been proposed in which thin insulating coatings are disposed on rectilinear portions of conductor wires that are housed inside slots, which have smaller electric potential differences, and thick insulating coatings are disposed on coil end portions, which have larger electric potential differences, to increase space factor inside the slots while ensuring required insulation performance in the coil end portions (see Patent Literature 1, for example).

CITATION LIST

Patent Literature

Patent Literature 1: Japanese Patent Laid-Open No. 2013-94019 (Gazette)

SUMMARY OF THE INVENTION

Problem to be Solved by the Invention

In conventional rotary electric machines such as that described in Patent Literature 1, because thick insulating material is disposed on the coil end portions, one problem has been that the coil end portions overlap with each other radially with the thick insulating material interposed, enlarging the coil ends radially.

The present invention aims to solve the above problems and an object of the present invention is to provide a rotary electric machine and a manufacturing method therefor that can ensure required insulation performance in coil end portions, and that can increase space factor by adapting a shape of a conductor wire so as to suppress increases in radial dimensions of coil ends.

Means for Solving the Problem

A rotary electric machine according to the present invention includes an armature that includes: an annular armature core in which slots are arranged circumferentially; and an armature winding that is mounted to the armature core. The armature winding includes a plurality of distributed winding bodies that are each produced by winding a single conductor wire that is insulated, that is jointless and continuous, and that has a constant cross-sectional area perpendicular to a longitudinal direction. The conductor wires are configured by alternately arranging rectilinear portions and coil end portions in the longitudinal direction of the conductor wires: the rectilinear portions being inserted into the slots; and the coil end portions linking the rectilinear portions that are inserted into the slots that are positioned on two sides of a plurality of circumferentially consecutive teeth; and a plurality of the rectilinear portions are housed inside the slots so as to line up in a single column in a radial direction, and a radial width of the rectilinear portions is wider than a radial width of the coil end portions.

Effects of the Invention

According to the present invention, conductor wires are formed such that rectilinear portions that are inserted into slots and coil end portions that link the rectilinear portions that are inserted into the slots, that are positioned on two sides of a plurality of teeth, are lined up alternately in a longitudinal direction of the conductor wire, and when mounted onto an armature core, radial widths of the rectilinear portions are wider than radial widths of the coil end portions. Thus, because gaps are formed between radially adjacent coil end portions, insulation performance that is required in the coil end portions can be ensured without increasing the thickness of insulating material on the coil end portions. Increases in radial dimensions of coil ends that result from the coil end portions interfering with each other can thereby be suppressed. In addition, because the rectilinear portions are housed inside the slots so as to be in contact with each other, space factor can be increased.

BRIEF DESCRIPTION OF THE DRAWINGS

FIG. 9 is a diagram that explains a mounted state of the winding body to the armature core in the rotary electric machine according to Embodiment 1 of the present invention;

FIG. 10 is a plan that shows a conductor strand that constitutes a raw material of the conductor wire that constitutes the winding body in the rotary electric machine according to Embodiment 1 of the present invention;

FIG. 11 shows cross sections that explain a step of shaping a rectilinear portion of the winding body in the rotary electric machine according to Embodiment 1 of the present invention;

DESCRIPTION OF EMBODIMENTS

Preferred embodiments of a rotary electric machine and a manufacturing method therefor according to the present invention will now be explained with reference to the drawings.

Embodiment 1

Figure 1:
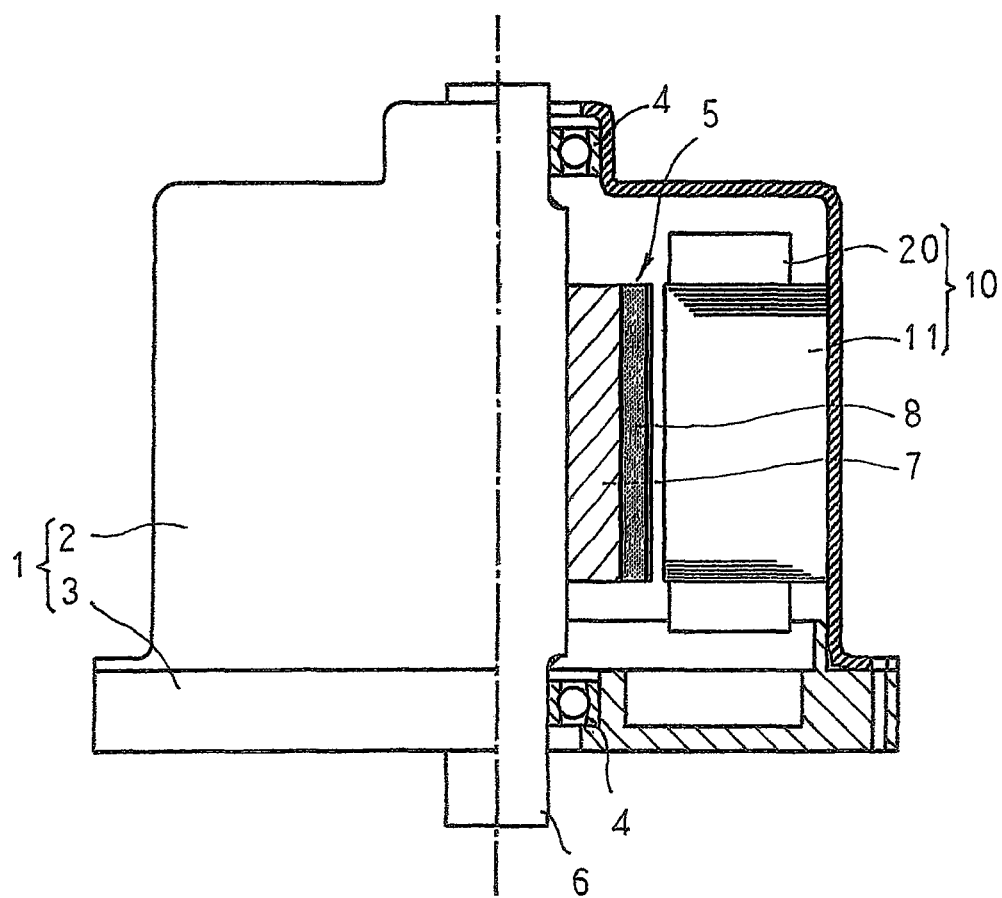
FIG. 1 is a half section that shows a rotary electric machine according to Embodiment 1 of the present invention.
Figure 2:
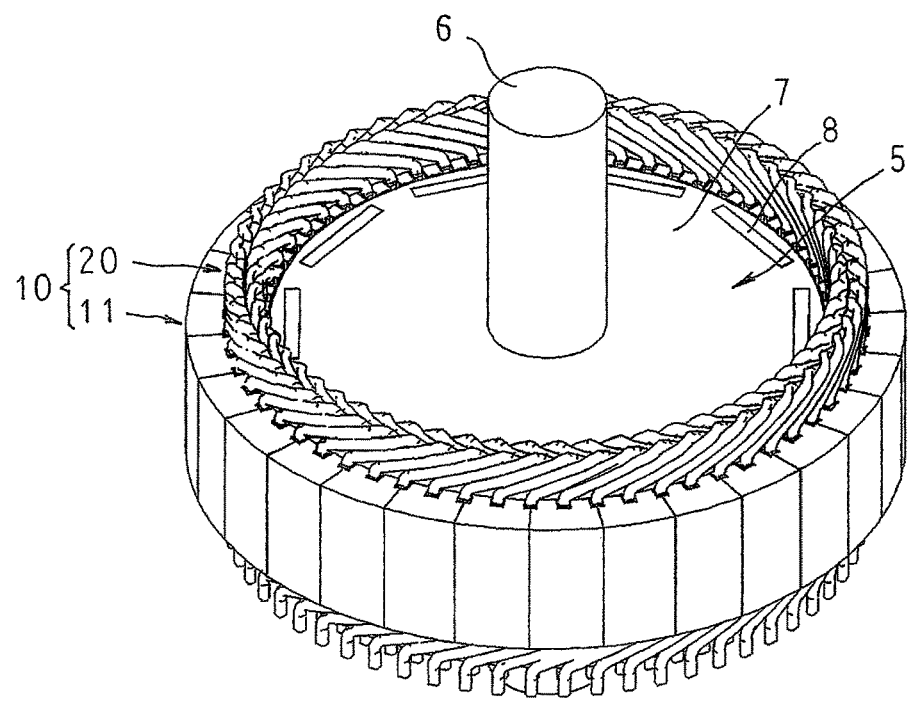
FIG. 2 is an oblique projection that shows part of the rotary electric machine according to Embodiment 1 of the present invention.
Figure 3:
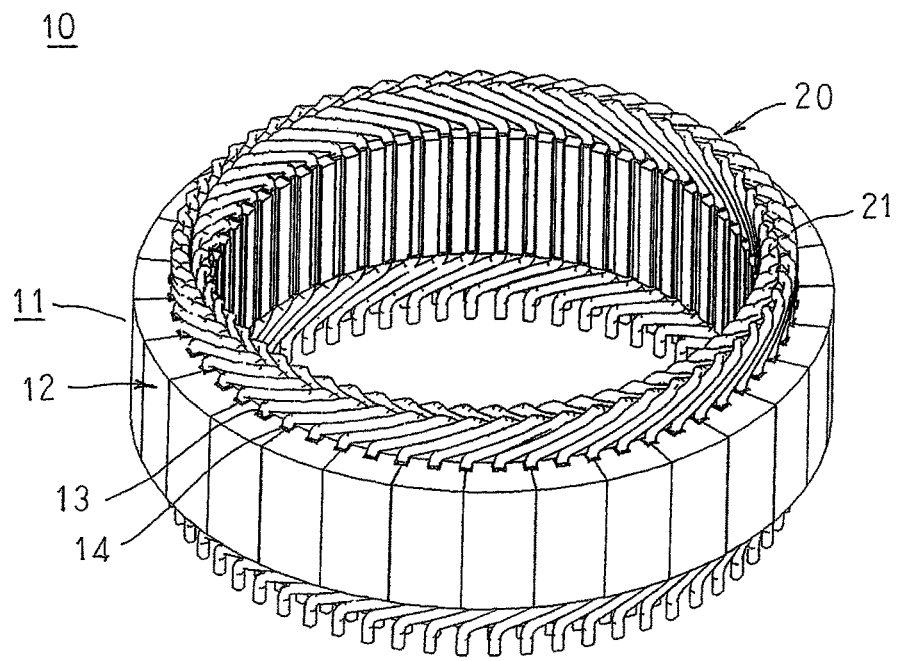
FIG. 3 is an oblique projection that shows an armature in the rotary electric machine according to Embodiment 1 of the present invention.
Figure 4:
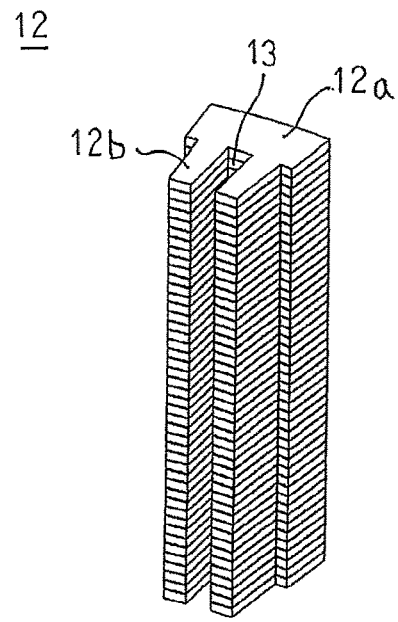
FIG. 4 is an oblique projection that shows a core block that constitutes part of an armature core in the rotary electric machine according to Embodiment 1 of the present invention.
Figure 5:
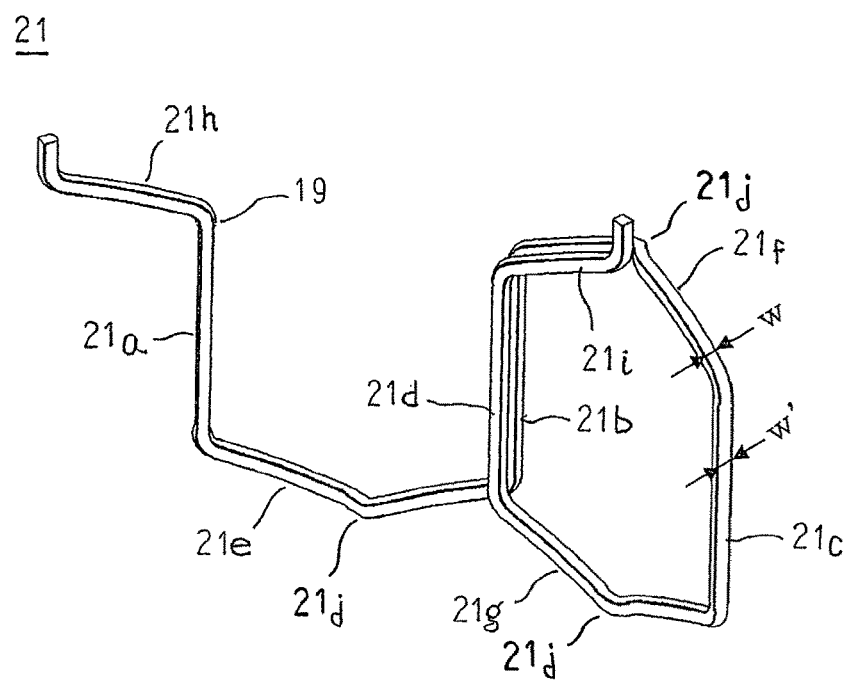
FIG. 5 is an oblique projection that shows a winding body that constitutes part of an armature winding in the rotary electric machine according to Embodiment 1 of the present invention.
Figure 6:
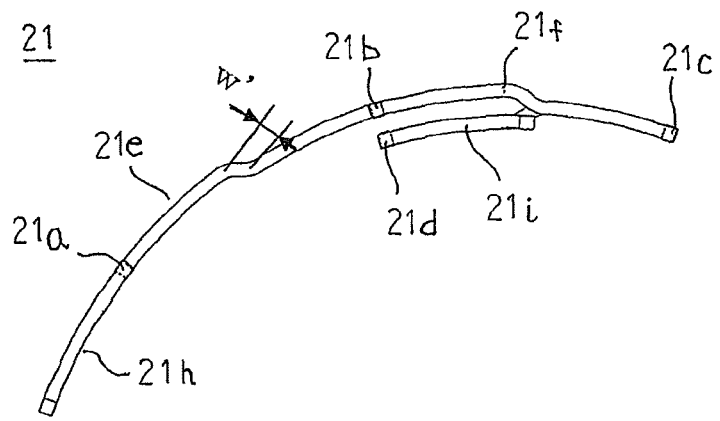
FIG. 6 is an end elevation that shows the winding body that constitutes part of the armature winding in the rotary electric machine according to Embodiment 1 of the present invention.
Figure 7:
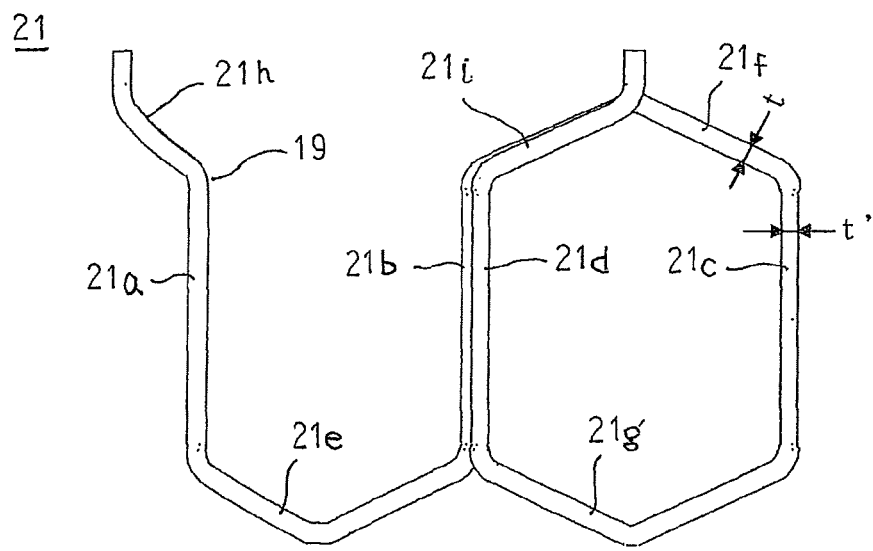
FIG. 7 is a front elevation that shows the winding body that constitutes part of the armature winding in the rotary electric machine according to Embodiment 1 of the present invention.
Figure 8A:
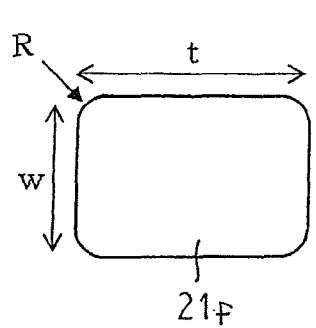
FIGS. 8A and 8B show cross sections that show cross-sectional shapes of a conductor wire that constitutes the winding body in the rotary electric machine according to Embodiment 1 of the present invention.
Figure 8B:
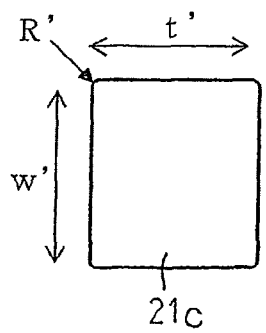

FIG. 1 is a half section that shows a rotary electric machine according to Embodiment 1 of the present invention, FIG. 2 is an oblique projection that shows part of the rotary electric machine according to Embodiment 1 of the present invention, FIG. 3 is an oblique projection that shows an armature in the rotary electric machine according to Embodiment 1 of the present invention, FIG. 4 is an oblique projection that shows a core block that constitutes part of an armature core in the rotary electric machine according to Embodiment 1 of the present invention, FIG. 5 is an oblique projection that shows a winding body that constitutes part of an armature winding in the rotary electric machine according to Embodiment 1 of the present invention, FIG. 6 is an end elevation that shows the winding body that constitutes part of the armature winding in the rotary electric machine according to Embodiment 1 of the present invention, FIG. 7 is a front elevation that shows the winding body that constitutes part of the armature winding in the rotary electric machine according to Embodiment 1 of the present invention, and FIGS. 8A and 8B show cross sections that show cross-sectional shapes of a conductor wire that constitutes the winding body in the rotary electric machine according to Embodiment 1 of the present invention, FIG. 8A showing a cross-sectional shape of a coil end portion, and FIG. 8B showing a cross-sectional shape of a rectilinear portion of a conductor wire. FIG. 9 is a diagram that explains a mounted state of the winding body to the armature core in the rotary electric machine according to Embodiment 1 of the present invention.

In FIGS. 1 and 2, a rotary electric machine 100 includes: a housing 1 that has: a floored cylindrical frame 2; and an end plate 3 that closes an opening of the frame 2; an armature 10 that is fixed to a cylindrical portion of the frame 2 in an internally fitted state; and a rotor 5 that is fixed to a rotating shaft 6 that is rotatably supported in the floor portion of the frame 2 and the end plate 3 by means of bearings 4 so as to be rotatably disposed on an inner circumferential side of the armature 10.

The rotor 5 is a permanent-magnet rotor that includes: a rotor core 7 that is fixed to the rotating shaft 6, which is inserted through a central position thereof; and permanent magnets 8 that are embedded in a vicinity of an outer circumferential surface of the rotor core 7 so as to be arranged at a uniform pitch circumferentially to constitute magnetic poles. Moreover, the rotor 5 is not limited to a permanent-magnet rotor, and a squirrel-cage rotor in which uninsulated rotor conductors are housed in slots of a rotor core such that two sides are shorted by a shorting ring, or a wound rotor in which insulated conductor wires are mounted into slots of a rotor core, etc., may be used.

Next, configuration of the armature 10 will be explained in detail with reference to FIGS. 3 through 9.

As shown in FIG. 3, the armature 10 includes: an armature core 11; an armature winding 20 that is mounted to the armature core 11; and slot cells 14 that are mounted into slots 13 of the armature core 11. The armature winding 20 is configured by connecting a plurality of winding bodies 21 that are mounted into the armature core 11. The slot cells 14 are formed into angular C shapes by bending and shaping oblong sheets that are produced by sandwiching a polyimide film between meta-aramid fibers, for example, and are inserted into the slots 13 to isolate the armature core 11 and the armature winding 20 electrically.

Here, to facilitate explanation, the number of poles in the rotor 5 is ten, the number of slots in the armature core 11 is sixty, and the armature winding 20 is a three-phase winding. In other words, the slots 13 are formed on the armature core 11 at a ratio of two slots per phase per pole.

As shown in FIG. 4, a core block 12 includes: a core back portion 12a that has a circular arc-shaped cross section, that is produced by laminating and integrating thin electromagnetic steel sheets; and two teeth 12b that each project radially inward from an inner circumferential wall surface of the core back portion 12a so as to be separated in a circumferential direction. Thirty core blocks 12 are arranged into an annular shape by butting together circumferential side surfaces of the core back portions 12a such that the teeth 12b are oriented radially inward, and are integrated to configure the armature core 11. In other words, these core blocks 12 are made by dividing the annular armature core 11 into thirty equal sections circumferentially. The core back portions 12a are arranged into an annular shape circumferentially to constitute the core back of the armature core 11. The slots 13, which are formed by the core back portions 12a and the teeth 12b, are arranged in a row at a uniform angular pitch circumferentially so as to be open on an inner circumferential side. The teeth 12b are formed so as to have a tapered shape in which a circumferential width becomes gradually narrower radially inward, and a cross section of the slots 13 that is perpendicular to the central axis of the armature core 11 is oblong.

As shown in FIGS. 5 through 7, the winding bodies 21 that constitute the armature winding 20 include: first, second, third, and fourth rectilinear portions 21a, 21b, 21c, and 21d that form three rows so as to be an angular spacing of six slots apart; a first coil end portion 21e that links second longitudinal ends of the first and second rectilinear portions 21a and 21b to each other; a second coil end portion 21f that links first longitudinal ends of the second and third rectilinear portions 21b and 21c to each other; a third coil end portion 21g that links second longitudinal ends of the third and fourth rectilinear portions 21c and 21d to each other; a radially outer terminal 21h that extends from a first longitudinal end of the first rectilinear portion 21a; and a radially inner terminal 21i that extends from a first longitudinal end of the fourth rectilinear portion 21d. The radially outer terminal 21h and the radially inner terminal 21i are connected to other winding bodies 21, electric power supplying portions, neutral points, etc.

Moreover, an angular spacing of six slots is a spacing between slot centers of slots 13 on two sides of six consecutive teeth 12b. Thus, in Embodiment 1, in which the slots 13 are formed at a ratio of two slots per phase per pole, and the armature winding 20 is a three-phase winding, an angular spacing of six slots corresponds to a pitch of one magnetic pole.

Specifically, as shown in FIG. 9, the winding bodies 21 are produced into a o-shaped coil pattern in which a conductor wire 19 that has a rectangular cross section, that is made of jointless continuous copper wire or aluminum wire, and that is insulated using an enamel resin, for example, is inserted into a first layer inside the slots 13 at Slot Number 1 from near a first axial end of the armature core 11, extends outward from the slots 13 at Slot Number 1 at a second axial end of the armature core 11, is inserted into a second layer inside the slots 13 at Slot Number 7, which is separated by an angular spacing of six slots in a first circumferential direction, extends outward from the slots 13 at Slot Number 7 at a second axial end of the armature core 11, is inserted into a third layer inside the slots 13 at Slot Number 13, which is separated by an angular spacing of six slots in the first circumferential direction, extends outward from the slots 13 at Slot Number 13 at the second axial end of the armature core 11, is inserted into a fourth layer inside the slots 13 at Slot Number 7, which is separated by an angular spacing of six slots in the second circumferential direction, and extends outward from the slots 13 at Slot Number 7 at the first axial end of the armature core 11. Moreover, the cross-sectional area perpendicular to the longitudinal direction of the conductor wire 19 is constant in the longitudinal direction. Furthermore, the winding bodies 21 may be produced using a conductor wire that has a circular cross section instead of the conductor wire 19 that has a rectangular cross section.

Here, the first through third coil end portions 21e, 21f, and 21g have a rectangular cross section that has a radial width w and a circumferential width t, as shown in FIG. 8A, and the first through fourth rectilinear portions 21a, 21b, 21c, and 21d, have a rectangular cross section that has a radial width w' and a circumferential width t', as shown in FIG. 8B. Moreover, w'>w, and t>t'. A curvature R of cross-sectional corner portions of the first through third coil end portions 21e, 21f, and 21g is greater than a curvature R' of cross-sectional corner portions of the first through fourth rectilinear portions 21a, 21b, 21c, and 21d. Housed positions of the conductor wire 19 that is housed inside the slots 13 are designated a first layer, a second layer, a third layer, and a fourth layer from radially outside for convenience. In FIGS. 9, 1, 2, through 12, and 13 are slot numbers that are allotted to the slots 13 sequentially in a circumferential direction.

The first rectilinear portion 21a is housed in the first layer inside the slots 13 at Slot Number 1, the second and fourth rectilinear portions 21b and 21d are housed in the second layer and the fourth layer inside the slots 13 at Slot Number 7, and the third rectilinear portion 21c is housed in the third layer inside the slots 13 at Slot Number 13. In other words, the first, second, third, and fourth rectilinear portions 21a, 21b, 21c, and 21d are arranged in three columns so as to be separated by an angular spacing of six slots.

The first coil end portion 21e that extends outward at the second axial end of the armature core 11 from the first layer inside the slots 13 at Slot Number 1 maintains its radial position and extends at a constant inclination in the first circumferential direction and axially outward, is displaced by w' radially inward at a central portion (a top portion), and subsequently maintains its radial position and extends at a reverse inclination in the first circumferential direction and axially inward to enter the second layer inside the slots 13 at Slot Number 7.

The second coil end portion 21f that extends outward at the first axial end of the armature core 11 from the second layer inside the slots 13 at Slot Number 7 maintains its radial position and extends at a constant inclination in the first circumferential direction and axially outward, is displaced by w' radially inward at a central portion (a top portion), and subsequently maintains its radial position and extends at a reverse inclination in the first circumferential direction and axially inward to enter the third layer inside the slots 13 at Slot Number 13.

The third coil end portion 21g that extends outward at the second axial end of the armature core 11 from the third layer inside the slots 13 at Slot Number 13 maintains its radial position and extends at a constant inclination in the second circumferential direction and axially outward, is displaced by w' radially inward at a central portion (a top portion), and subsequently maintains its radial position and extends at a reverse inclination in the second circumferential direction and axially inward to enter the fourth layer inside the slots 13 at Slot Number 7.

Thus, the first through third coil end portions 21e, 21f, and 21g have crank portions 21j that displace radially by the radial width w' of the first through fourth rectilinear portions 21a, 21b, 21c, and 21d at the top portions.

As shown in FIGS. 6 and 7, the radially outer terminal 21h that extends from the first layer inside the slots 13 at Slot Number 1 at the first axial end of the armature core 11 maintains its radial position, extends in the second circumferential direction and axially outward at a constant inclination, and is bent at a central portion (a top portion) to project radially outward. As shown in FIGS. 6 and 7, the radially inner terminal 21*i* that extends from the fourth layer inside the slots 13 at Slot Number 7 at the first axial end of the armature core 11 maintains its radial position, extends in the first circumferential direction and axially outward at a constant inclination, and is bent at a central portion (a top portion) to project radially outward.

Figure 12:
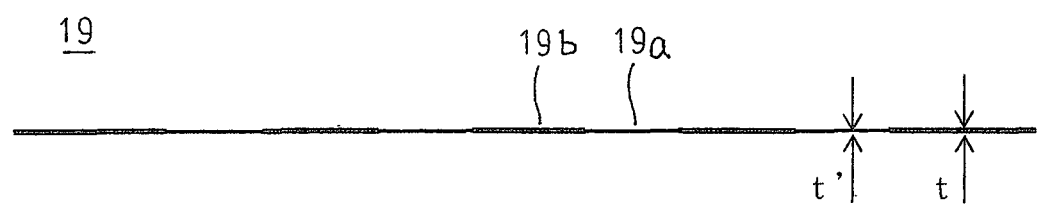
FIG. 12 is a plan that shows the conductor wire that constitutes the winding body in the rotary electric machine according to Embodiment 1 of the present invention.

Next, a manufacturing method for the winding bodies 21 will be explained using FIGS. 10 through 13. FIG. 10 is a plan that shows a conductor strand that constitutes a raw material of the conductor wire that constitutes the winding body in the rotary electric machine according to Embodiment 1 of the present invention, and FIG. 11 shows cross sections that explain a step of shaping a rectilinear portion of the winding body in the rotary electric machine according to Embodiment 1 of the present invention, FIG. 11(*a*) showing a state before shaping, and FIG. 11(*b*) showing a state after shaping. FIG. 12 is a plan that shows the conductor wire that constitutes the winding body in the rotary electric machine according to Embodiment 1 of the present invention.

As shown in FIG. 10, a conductor strand 23 is first cut to a length that is required in order to produce one winding body 21 from a wire material in which a cross-sectional shape perpendicular to a longitudinal direction is rectangular (w×t), a corner portion curvature is R, and a cross-sectional area is constant in a longitudinal direction. Next, as shown in FIGS. 11(*a*) and 11(*b*), a region that corresponds to the first rectilinear portions 21*a* of the conductor strand 23 is inserted into a die 70, and is crushed to form a deformed portion 19*a* that has a rectangular cross section that is w'×t', and a corner portion curvature that is R'. In addition, three regions that correspond to the second, third, and fourth rectilinear portions 21*b*, 21*c*, and 21*d* of the conductor strand 23 are sequentially inserted into the die 70, and are crushed to form a rectilinear conductor wire 19 on which four deformed portions 19*a* are formed, as shown in FIG. 12.

The deformed portions 19*a* and undeformed portions 19*b* are arranged alternately in the longitudinal direction on this rectilinear conductor wire 19. The four deformed portions 19*a* respectively correspond to the first through fourth rectilinear portions 21*a*, 21*b*, 21*c*, and 21*d*. The five undeformed portions 19*b* respectively correspond to the radially outer terminal 21*h*, the first through third coil end portions 21*e*, 21*f*, and 21*g*, and the radially inner terminal 21*i*. Next, the conductor wire 19 is bent into a a shape, and the crank shapes at the top portions of the coil end portions and the curvature of the coil end portions are formed to produce the winding body 21 that is shown in FIGS. 5 through 7.

Figure 13:
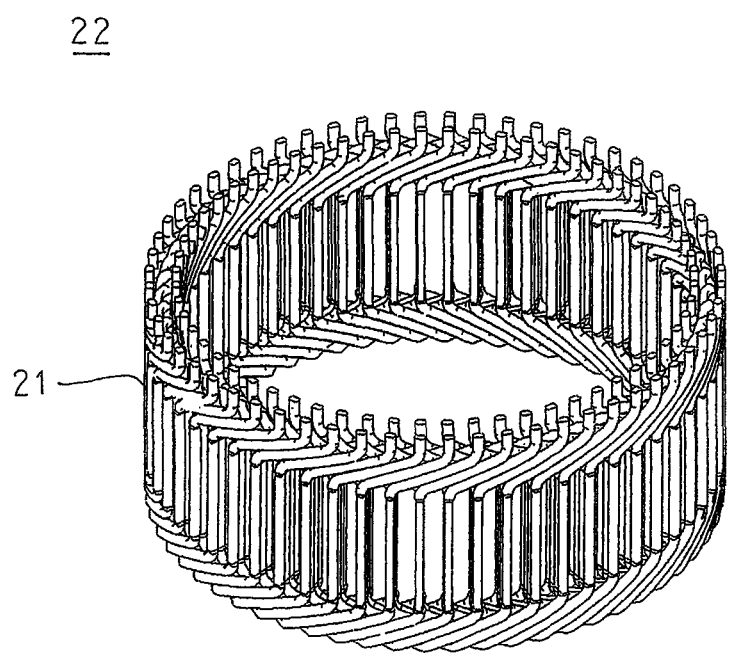
FIG. 13 is an oblique projection that shows a winding assembly in the rotary electric machine according to Embodiment 1 of the present invention.
Figure 14:
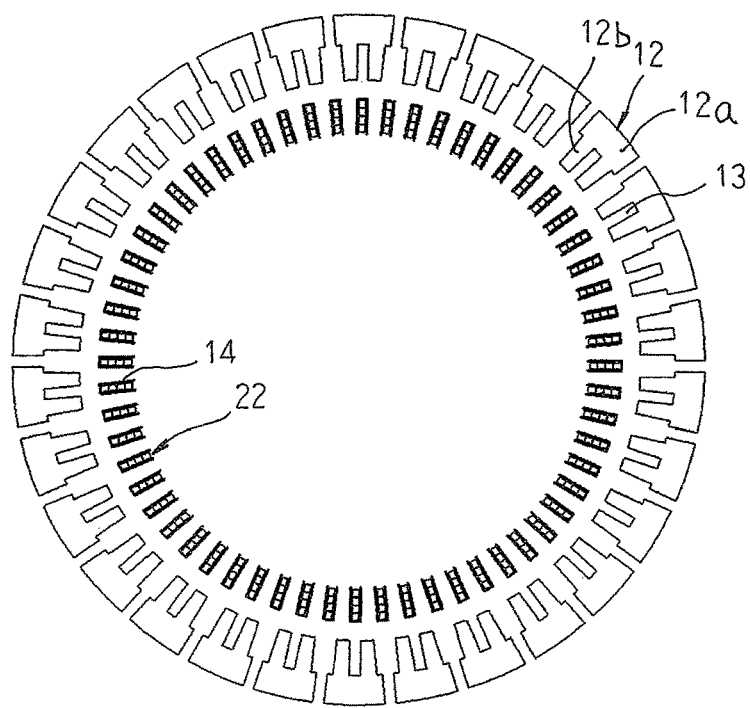
FIG. 14 is a diagram that explains a method for assembling the armature in the rotary electric machine according to Embodiment 1 of the present invention.
Figure 15:
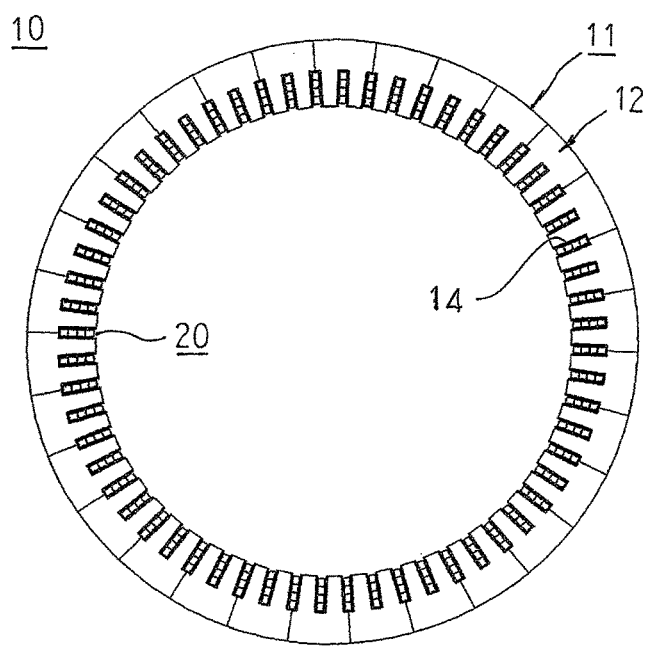
FIG. 15 is a diagram that explains the method for assembling the armature in the rotary electric machine according to Embodiment 1 of the present invention.
Figure 16:
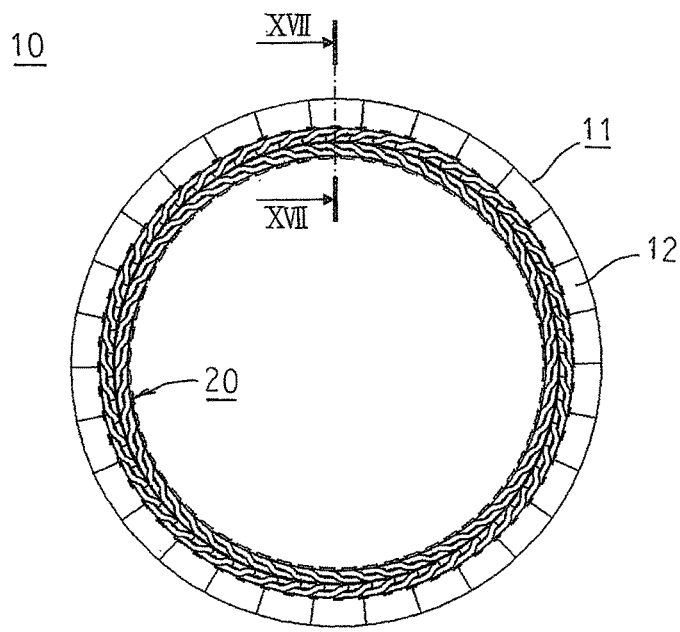
FIG. 16 is a diagram that explains the method for assembling the armature in the rotary electric machine according to Embodiment 1 of the present invention.
Figure 17:
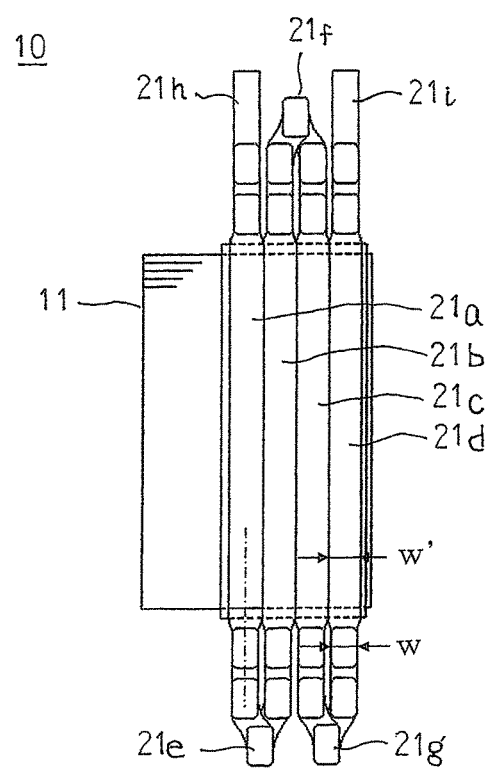
FIG. 17 is a cross section that is taken along Line XVII-XVII in FIG. 16 so as to be viewed in the direction of the arrows.

Next, a method for mounting the winding bodies 21 to the armature core 11 will be explained with reference to FIGS. 13 through 17. FIG. 13 is an oblique projection that shows a winding assembly in the rotary electric machine according to Embodiment 1 of the present invention, and FIGS. 14 through 17 are diagrams that explain a method for assembling the armature in the rotary electric machine according to Embodiment 1 of the present invention, FIG. 14 showing a state before armature assembly, and FIGS. 15 and 16 showing a state after armature assembly. FIG. 17 is a cross section that is taken along Line XVII-XVII in FIG. 16 so as to be viewed in the direction of the arrows. Moreover, in FIGS. 14 and 15, a winding assembly 22 is represented using only the first through fourth rectilinear portions 21*a*, 21*b*, 21*c*, and 21*d* for convenience.

Sixty winding bodies 21 are arranged circumferentially at a pitch of one slot to produce the annular winding assembly 22 that is shown in FIG. 13. In this winding assembly 22, the first through fourth rectilinear portions 21*a*, 21*b*, 21*c*, and 21*d* are arranged in sixty columns at a pitch of one slot circumferentially so as to have the width w' of the rectangular cross sections as their radial widths such that rectilinear portion columns are each arranged in a single column in a radial direction. The second coil end portions 21*f* are arranged circumferentially at a pitch of one slot at a first axial end of the winding assembly 22 to constitute first coil ends. The radially outer terminals 21*h* and the radially inner terminals 21*i* are arranged circumferentially at a pitch of one slot on an outer circumferential side and an inner circumferential side, respectively, of the first coil ends. At a second axial end of the winding assembly 22, a layer that is formed by arranging the first coil end portions 21*e* circumferentially at a pitch of one slot and a layer that is formed by arranging the third coil end portions 21*g* circumferentially at a pitch of one slot line up in two layers in a radial direction to constitute second coil ends.

Next, the slot cells 14 are mounted onto each of the rectilinear portion columns of the first through fourth rectilinear portions 21*a*, 21*b*, 21*c*, and 21*d*. Next, thirty core blocks 12 are arranged at a uniform angular pitch circumferentially such that respective teeth are positioned on a radially outer side between adjacent rectilinear portion columns of the winding assembly 22, as shown in FIG. 14. Next, the core blocks 12 that are arranged circumferentially are moved radially inward. The respective teeth 12*b* of the core blocks 12 are thereby inserted between the adjacent rectilinear portion columns.

Then, when the core blocks 12 that are arranged circumferentially are moved further radially inward, the circumferential side surfaces of the adjacent core blocks 12 are butted together, preventing radially inward movement of the core blocks 12. The winding assembly 22 is thereby mounted onto the armature core 11, as shown in FIGS. 15 through 17. Alternating-current connection is then applied to the winding assembly 22 to configure the armature winding 20.

According to Embodiment 1, a radial width w' of first through fourth rectilinear portions 21*a*, 21*b*, 21*c*, and 21*d* is wider than a radial width w of first through third coil end portions 21*e*, 21*f*, and 21*g*, radially outer terminals 21*h*, and radially inner terminals 21*i*. Thus, as shown in FIG. 17, the first through third coil end portions 21*e*, 21*g*, and 21*f*, the radially outer terminals 21*h*, and the radially inner terminals 21*i* are arranged in a radial direction so as to be separated from each other. Consequently, gaps are formed between the conductor wires 19 of the coil ends, enabling the insulating distance between the phases to be ensured. Thus, it is not necessary to increase the thickness of the insulating material that is coated onto the first through third coil end portions 21*e*, 21*g*, and 21*f*, the radially outer terminals 21*h*, and the radially inner terminals 21*i*, enabling enlargement of the radial dimensions of the coil ends to be suppressed. Furthermore, steps such as partially increasing the thickness of insulating coatings of the conductor wires 19 are no longer necessary, enabling increases in manufacturing costs of the conductor wire 19 to be suppressed.

As shown in FIG. 17, because the first through fourth rectilinear portions 21*a*, 21*b*, 21*c*, and 21*d* are housed inside the slots 13 so as to line up in a single column in a radial direction so as to be in contact with each other, space factor can be increased, enabling the efficiency of the rotary electric machine 100 to be improved.

Because the corner portion curvature R' of the first through fourth rectilinear portions 21*a*, 21*b*, 21*c*, and 21*d* is smaller than the corner portion curvature R of the first through third coil end portions 21e, 21g, and 21f, gaps inside the slots 13 that house the first through fourth rectilinear portions 21a, 21b, 21c, and 21d are reduced. Thus, the space factor is further increased, and heat transference from the armature winding 20 to the armature core 11 is also increased, enabling the armature winding 20 to be cooled effectively.

Figure 18:
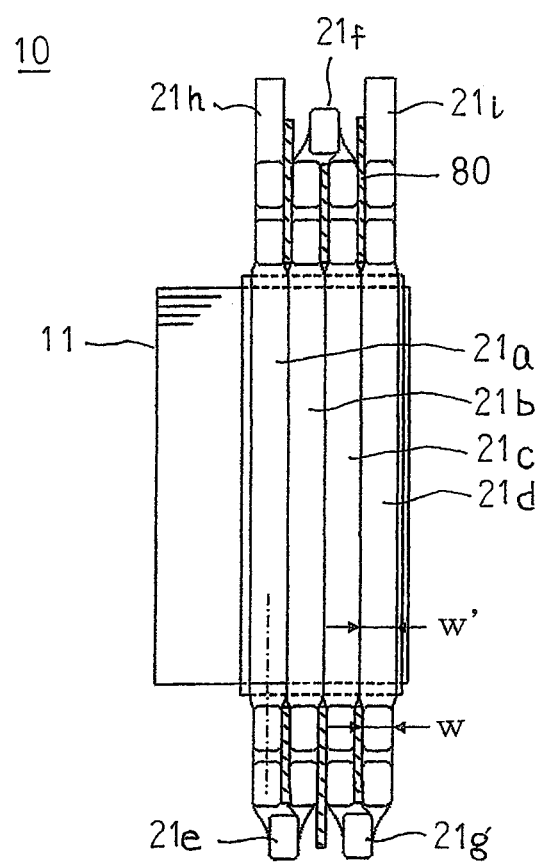
FIG. 18 is a partial cross section that shows an armature in a rotary electric machine according to a variation of Embodiment 1 of the present invention.

Moreover, in Embodiment 1 above, gaps are formed between the conductor wires 19 of the coil ends to ensure interphase insulating distances, but insulating sheets 80 that function as insulating members may be inserted into the gaps between the conductor wires 19 of the coil ends, as shown in FIG. 18. The phases can thereby be insulated more reliably from each other.

Embodiment 2

Figure 19:
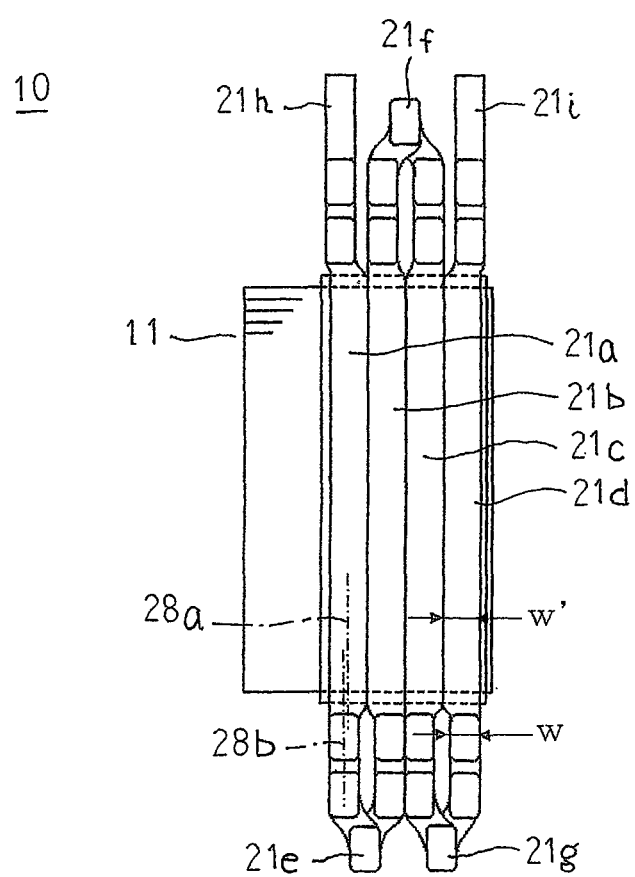
FIG. 19 is a partial cross section that shows an armature in a rotary electric machine according to Embodiment 2 of the present invention.

FIG. 19 is a partial cross section that shows an armature in a rotary electric machine according to Embodiment 2 of the present invention.

In FIG. 19, radial positions 28b of conductor centers of portions of first coil end portions 21e that extend from first rectilinear portions 21a to top portions are displaced radially outward relative to radial positions 28a of conductor centers of the first rectilinear portions 21a, and radial positions of conductor centers of portions of the first coil end portions 21e that extend from the top portions to second rectilinear portions 21b are displaced radially inward relative to radial positions of conductor centers of the second rectilinear portions 21b. Radial positions of conductor centers of portions of second coil end portions 21f that extend from the second rectilinear portions 21b to top portions are displaced radially outward relative to radial positions of conductor centers of the second rectilinear portions 21b, and radial positions of conductor centers of portions of the second coil end portions 21f that extend from the top portions to third rectilinear portions 21c are displaced radially inward relative to radial positions of conductor centers of the third rectilinear portions 21c. Radial positions of conductor centers of portions of third coil end portions 21g that extend from the third rectilinear portions 21c to top portions are displaced radially outward relative to radial positions of conductor centers of the third rectilinear portions 21c, and radial positions of conductor centers of portions of the third coil end portions 21g that extend from the top portions to fourth rectilinear portions 21d are displaced radially inward relative to radial positions of conductor centers of the fourth rectilinear portions 21d.

Moreover, the rest of the configuration is formed in a similar or identical manner to that of Embodiment 1 above.

According to Embodiment 2, gaps between inclined portions on two sides of top portions of first coil end portions 21e are ensured to be wide. Similarly, gaps between inclined portions on two sides of top portions of second coil end portions 21f are ensured to be wide, and gaps between inclined portions on two sides of top portions of third coil end portions 21g are ensured to be wide. Thus, insulating distance between phases can be ensured to be even wider.

Figure 20:
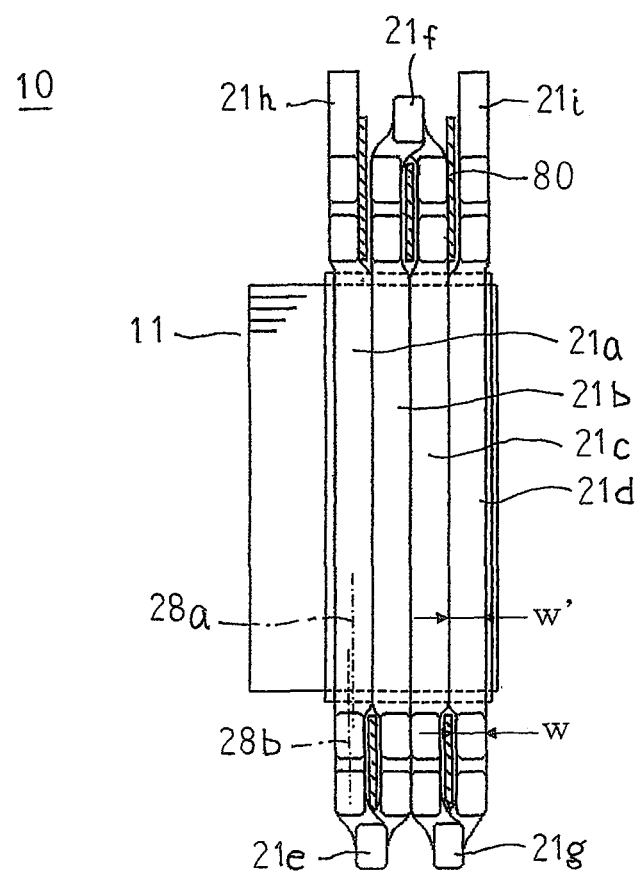
FIG. 20 is a partial cross section that shows an armature in a rotary electric machine according to a variation of Embodiment 2 of the present invention.

Moreover, in Embodiment 2 above, gaps are formed between the conductor wires 19 of the coil ends to ensure interphase insulating distances, but insulating sheets 80 may be inserted into the gaps between the conductor wires 19 of the coil ends, as shown in FIG. 20. The phases can thereby be insulated more reliably from each other.

Embodiment 3

Figure 21:
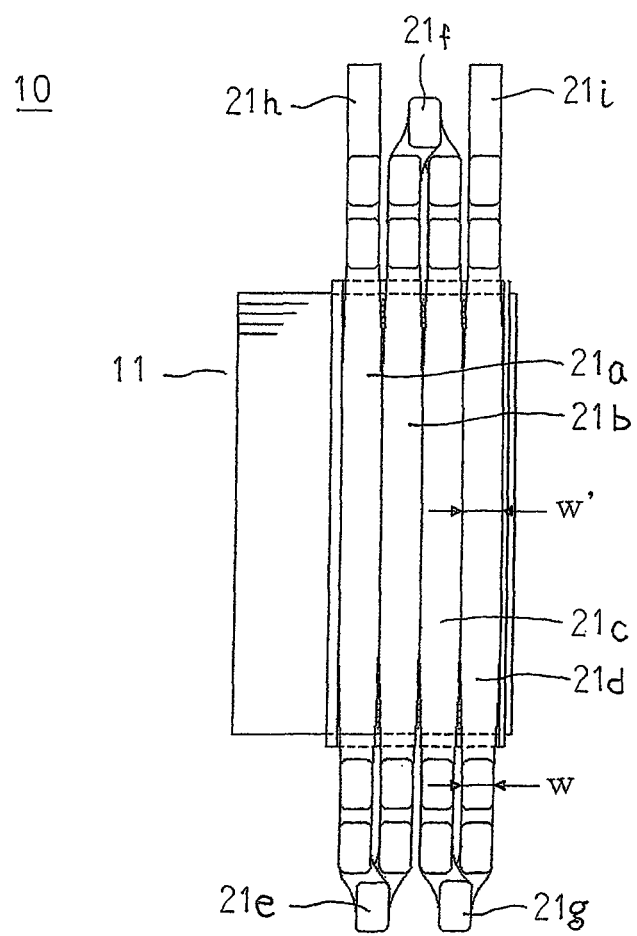
FIG. 21 is a partial cross section that shows an armature in a rotary electric machine according to Embodiment 3 of the present invention.

FIG. 21 is a partial cross section that shows an armature in a rotary electric machine according to Embodiment 3 of the present invention.

In FIG. 21, first rectilinear portions 21a are formed such that radial widths are at a maximum value (w') except for two longitudinal end regions, the radial widths become narrower toward two end portions in the two longitudinal end regions, and are at a minimum value (w=the radial widths of the first through third coil end portions 21e, 21f, and 21g) at the two end portions. Second through fourth rectilinear portions 21b, 21c, 21d are also formed in a similar manner.

Moreover, the rest of the configuration is formed in a similar or identical manner to that of Embodiment 1 above.

According to Embodiment 3, radial widths of first through fourth rectilinear portions 21a, 21b, 21c, and 21d are reduced monotonically from longitudinally central portions toward two end portions. Thus, because gaps are formed between the first through fourth rectilinear portions 21a, 21b, 21c, and 21d, a varnish can be reliably impregnated between the first through fourth rectilinear portions 21a, 21b, 21c, and 21d.

Moreover, in Embodiment 3 above, radial widths of the first through fourth rectilinear portions are tapered so as to become gradually narrower only in two longitudinal end regions, but the radial widths of the first through fourth rectilinear portions may be made so as to have a tapered shape that becomes gradually narrower from longitudinally central portions toward the two end portions.

Figure 22:
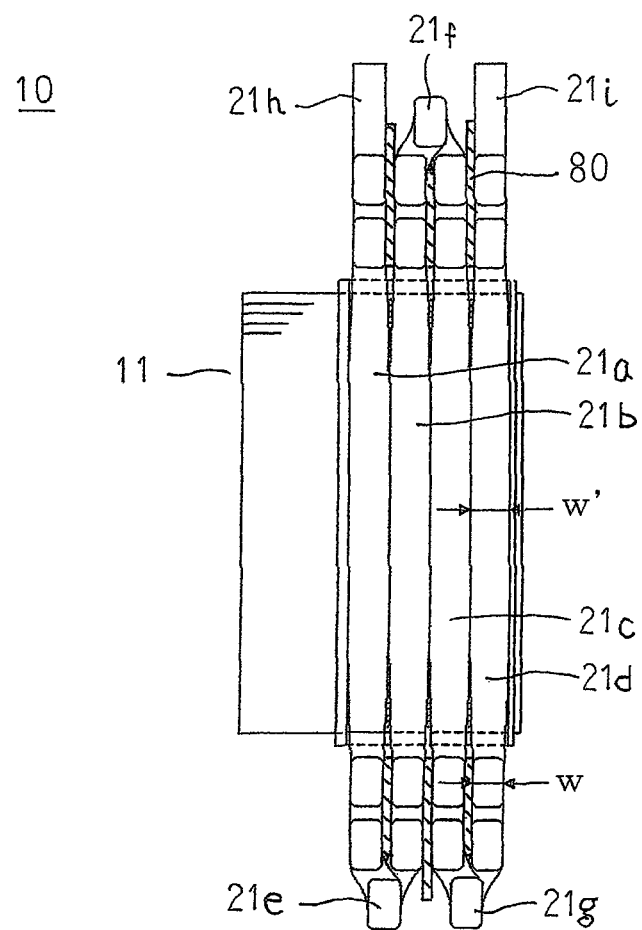
FIG. 22 is a partial cross section that shows an armature in a rotary electric machine according to a variation of Embodiment 3 of the present invention.

In Embodiment 3 above, gaps are formed between the conductor wires 19 of the coil ends to ensure interphase insulating distances, but insulating sheets 80 may be inserted into the gaps between the conductor wires 19 of the coil ends, as shown in FIG. 22. The phases can thereby be insulated more reliably from each other.

Embodiment 4

Figure 23:
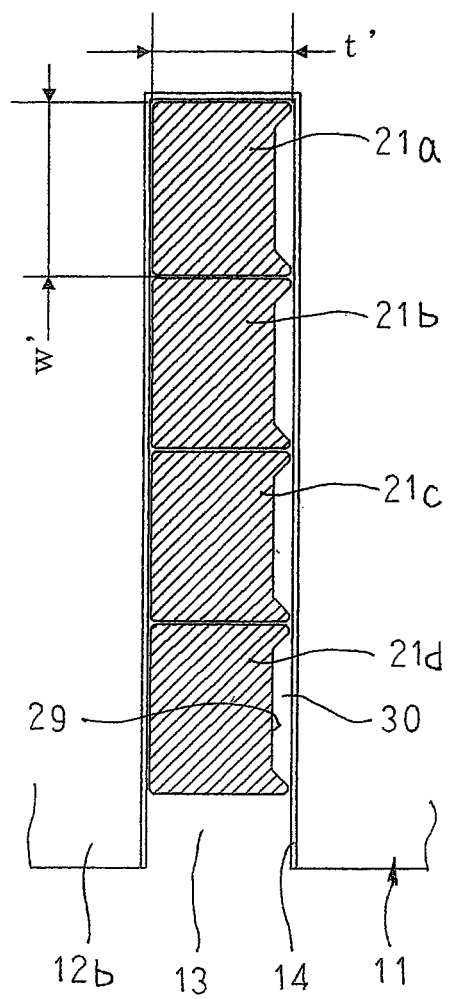
FIG. 23 is a partial cross section that shows an armature in a rotary electric machine according to Embodiment 4 of the present invention.
Figure 24:
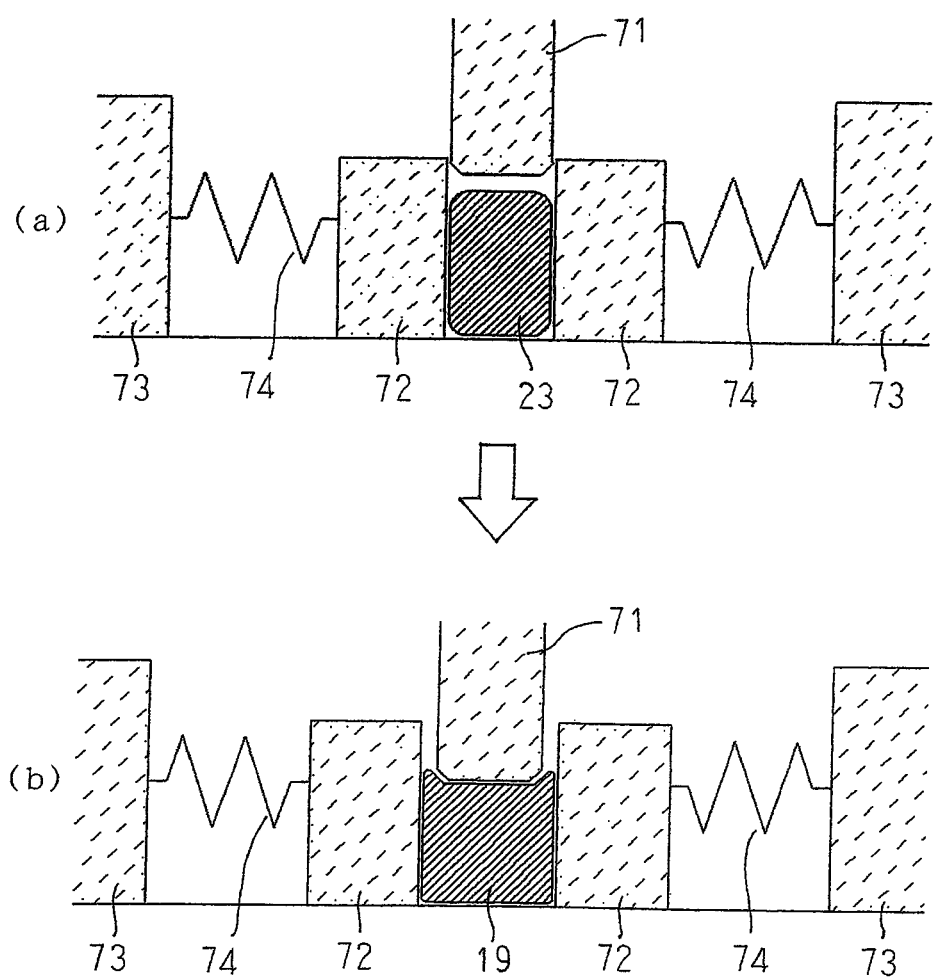
FIG. 24 shows cross sections that explain a step of shaping a rectilinear portion of a winding body in the rotary electric machine according to Embodiment 4 of the present invention.

FIG. 23 is a partial cross section that shows an armature in a rotary electric machine according to Embodiment 4 of the present invention, and FIG. 24 shows cross sections that explain a step of shaping a rectilinear portion of a winding body in the rotary electric machine according to Embodiment 4 of the present invention.

In FIG. 23, recess portions 29 are formed so as to extend from first longitudinal ends to second longitudinal ends on first circumferential side surfaces of first through fourth rectilinear portions 21a, 21b, 21c, and 21d.

Moreover, the rest of the configuration is formed in a similar or identical manner to that of Embodiment 1 above.

According to Embodiment 4, gaps 30 that are formed by the recess portions 29 and the slot cells 14 become coolant passages, enabling cooling of the armature 10 to be improved.

If a varnish is impregnated into the slots 13, the gaps 30 become passages for the varnish, enabling the varnish to be impregnated into the slots 13 effectively.

Next, a method for shaping the first through fourth rectilinear portions 21a, 21b, 21c, and 21d will be explained with reference to FIG. 24.

As shown in FIG. 24(a), a conductor strand 23 is first disposed between movable dies 72 that are mounted by means of elastic members 74 to a pair of fixed dies 73. Next, an upper the 71 is pressed against the conductor strand 23. Thus, as shown in FIG. 24(b), the conductor strand 23 is crushed, and widens in a direction that is perpendicular to the pressing force. The portion of the conductor strand 23 pressed by the upper die 71 thereby becomes a recess portion 29, to obtain the conductor wire 19.

According to Embodiment 4, because the movable dies 72 are linked to the fixed dies 73 by means of the elastic members 74, the pair of movable dies 72 clamp the conductor strand 23 by the forces from the elastic members 74. Thus, the position of the conductor strand 23 during press shaping by the upper the 71 is stabilized, enabling good quality shaping of the recess portions 29 to be performed.

Moreover, in each of the above embodiments, a ten-pole, sixty-slot rotary electric machine has been explained, but the number of poles and the number of slots are not limited to ten poles and sixty slots.

In each of the above embodiments, slots are formed at a ratio of two slots per phase per pole, but the number of slots per phase per pole is not limited to two, and may be one, or may be three or greater. In the case of a winding in which the number of slots per phase per pole is one, and the winding bodies are full-pitch windings, for example, the pitch between the rectilinear portions that are linked by the coil end portions will be an angular spacing of three slots (a pitch of one magnetic pole).

In each of the above embodiments, the winding bodies are formed into full-pitch windings, but the winding bodies may be configured into short-pitch windings or long-pitch windings.

In each of the above embodiments, the winding bodies are produced by winding conductor wires once into a o-shaped coil pattern, but winding bodies may be produced by winding conductor wires into a o-shaped coil pattern continuously for two or more turns.

In each of the above embodiments, the winding bodies are produced by winding conductor wires into a o-shaped coil pattern, but the winding bodies are not limited to o-shaped coil pattern windings provided that they are distributed windings, and may be hexagonal windings that are produced by winding conductor wires helically, or wave windings that are produced by winding conductor wires into wave windings, for example.

The invention claimed is:

1. A rotary electric machine comprising an armature that comprises:
    an annular armature core in which slots are arranged circumferentially; and
    an armature winding that is mounted to said armature core,
    wherein:
    said armature winding comprises a plurality of distributed winding bodies that each comprise a single conductor wire that is insulated, that is jointless and continuous, and that has a constant cross-sectional area perpendicular to a longitudinal direction;
    said conductor wires are configured by alternately arranging rectilinear portions and coil end portions in said longitudinal direction of said conductor wires, said rectilinear portions being inserted into said slots, and said coil end portions linking said rectilinear portions that are inserted into said slots that are positioned on two sides of a plurality of circumferentially consecutive teeth;
    said coil end portions comprise crank portions that displace radially by a radial width of said rectilinear portions;
    a plurality of said rectilinear portions are housed inside said slots so as to line up in a single column in a radial direction; and
    a radial width of said rectilinear portions is wider than a radial width of said coil end portions, wherein said rectilinear portions that are inserted into said slots are formed so as to be reduced monotonically from longitudinally central portions of said rectilinear portions toward two end portions such that radial widths thereof are at a maximum at said longitudinally central portions of said rectilinear portions, and become equal to radial widths of said coil end portions at said two longitudinal end portions of said rectilinear portions.

2. The rotary electric machine according to claim 1, wherein cross-sectional shapes of said rectilinear portions and said coil end portions perpendicular to said longitudinal direction are rectangular.

3. The rotary electric machine according to claim 2, wherein a corner portion curvature of said coil end portions is greater than a corner portion curvature of said rectilinear portions.

4. The rotary electric machine according to claim 1, wherein said rectilinear portions that are inserted into said slots have a recess portion that is formed so as to extend from a first longitudinal end to a second longitudinal end on a circumferential side surface of said rectilinear portions.

5. The rotary electric machine according to claim 1, further comprising an insulating member that is inserted between phases that are adjacent to each other in a radial direction of said coil end portions.

6. A manufacturing method for the rotary electric machine according to claim 1, said manufacturing method comprising steps of:
    cutting out conductor strands that have a prescribed length from a wire material that is insulated, that is jointless and continuous, and that has a constant cross-sectional area perpendicular to a longitudinal direction;
    applying pressing to said conductor strands using a die, to produce said conductor wires so as to be shaped such that said rectilinear portions and said coil end portions are lined up alternately in said longitudinal direction, and such that a radial width of said rectilinear portions is wider than a radial width of said coil end portions when mounted to said armature core; and
    producing said winding bodies by bending and folding said conductor wires.

* * * * *